Jan. 23, 1934.                M. CHRISTMAN                1,944,782
                              WHEEL HUB PLATE
                           Filed Aug. 27, 1931           2 Sheets-Sheet 1

Inventor
M. Christman

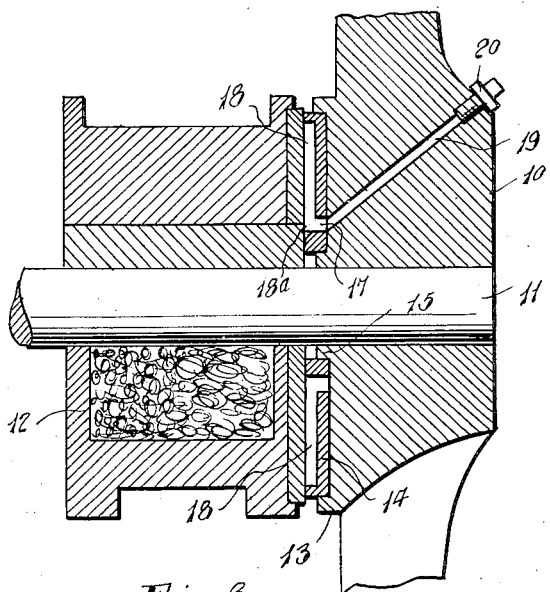
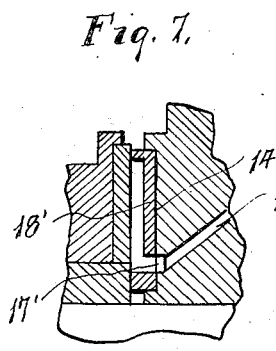
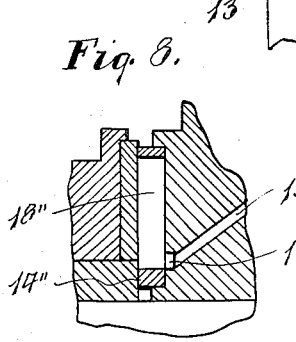
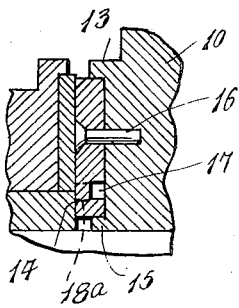
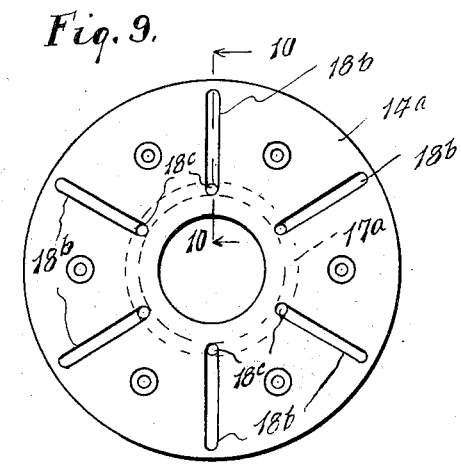
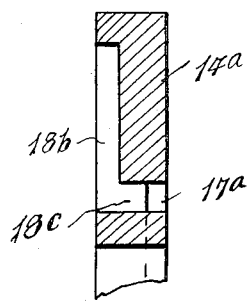

Patented Jan. 23, 1934

1,944,782

UNITED STATES PATENT OFFICE 1,944,782

WHEEL HUB PLATE

Matthias Christman, Springfield, Mo.

Application August 27, 1931. Serial No. 559,766

1 Claim. (Cl. 308—165)

This invention relates to a wheel hub plate, particularly for a locomotive driving wheel, and it aims to provide a novel construction which will afford efficient lubrication at all times; a construction in which lubricant will not be discharged by centrifugal force and which will tend to throw the grease centripetally and a construction by means of which grease may be positively supplied through the hub of the wheel when the driving boxes are snug up against the hub plate.

The more specific objects, construction and advantages will become apparent from a consideration of the description following taken in connection with accompanying drawings illustrating an operative embodiment.

In said drawings:—

Figure 1:
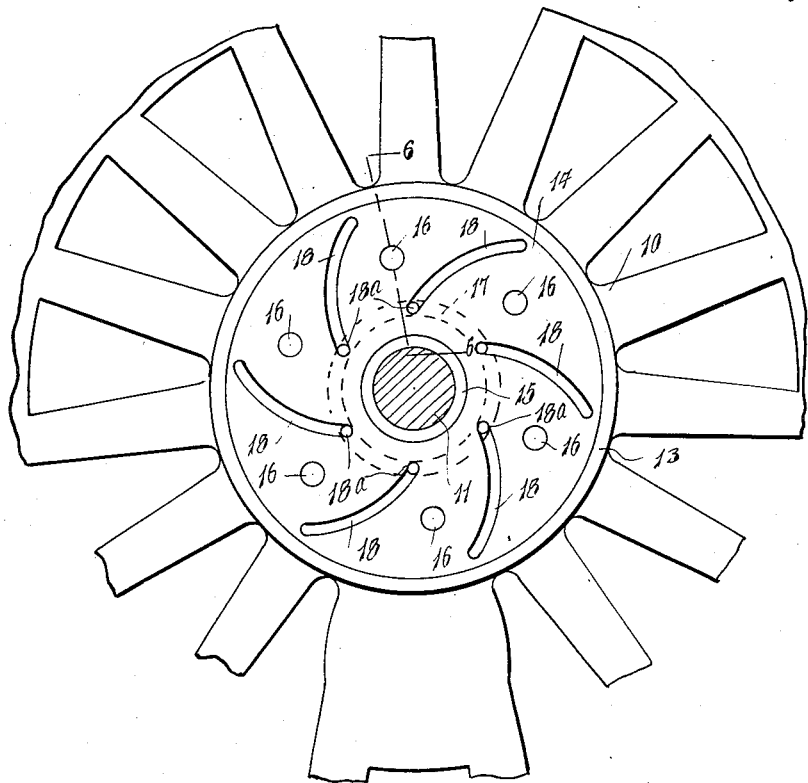
Figure 2:
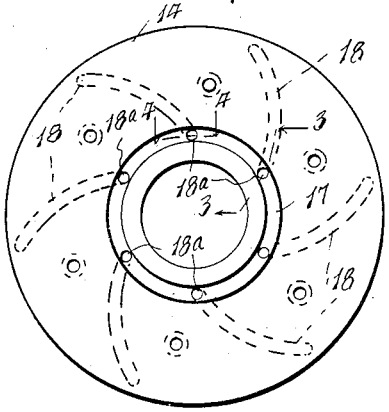
Figure 3:
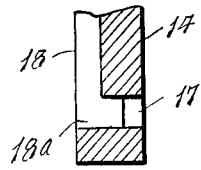
Figure 4:
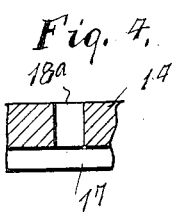

Figure 1 is a fragmentary view of a locomotive driving wheel equipped with the hub plate, the wear surface thereof being exposed, Figure 2 is a side elevation of the hub plate reverse to Figure 1, Figures 3 and 4 are detail sectional views taken on the lines 3—3 and 4—4, respectively of Figure 2, Figure 5 is a central vertical sectional view through the structure of Figure 1, Figure 6 is a sectional view taken on the line 6—6 of Figure 1, Figure 7 is a detail sectional view taken through a modification, Figure 8 is a detail sectional view taken through a second modification, Figure 9 is a front elevation of a modified form of hub plate, and Figure 10 is a sectional view taken on the line 10—10 of Figure 9.

The present invention is an improvement over that of Letters Patent No. 1,241,343, issued to me on September 25, 1917, and a construction of which was an improvement over Letters Patent 1,028,677, granted to me June 4, 1912. The present invention improves the construction of my previous inventions.

Referring specifically to the drawings, 10 designates a locomotive drive wheel, 11 the axle and 12 the bearing structure. Such wheel 10 has an annular flange at 13, which positions a removable hub plate 14, against the inner face of the hub of wheel 10 and against bearing structure 12. A central flange 15 is also provided to assist in positioning the hub plate. As best shown in Figure 6, the hub plate is detachably secured to the hub of the wheel 10 by passing a multiplicity of dowels or pins 16 removably through the same.

Said hub plate according to the present invention may have an annular groove 17 in one face thereof communicating with arcuate distributing grooves 18. Lubricant is supplied to the groove 17, through a channel or groove 19 formed in the hub of wheel 10, and carrying a fitting at 20, for attachment to a grease gun or the like, whereby lubricant may be supplied to the channel 19, groove 17 and grooves 18 supplied from groove 17 through openings 18$^a$. The grooves 18 efficiently supply the grease over the desired surface of the bearing and enable the grease to be applied, even when the bearing surfaces are snug up against the hub plate. Particular attention is called to the fact that the arcuate grooves 18 not only distribute the grease evenly over the desired surface but have a tendency to return the grease centripetally rather than centrifugally discharging the same at the periphery of the hub plate.

Various changes may be resorted to provided they fall within the spirit and scope of the invention.

For example, the modification of Figure 7 may be resorted to. In such figure the hub plate is designated 14', and has distributing grooves 18' corresponding to those at 18 and such grooves communicating with an annular groove 17', which in this instance is provided in the hub of wheel 10 rather than as a groove 17 in the hub plate. A passage 19' similar to that at 19 leads to the groove 17'.

In Figure 8, a further modification is shown, wherein the hub plate here designated 14'' has arcuate or straight grooves 18'' therethrough, serving the same function as the grooves 18 and 18'. Grooves 18'' may be supplied with lubricant from an annular groove such as 17' and a passage 19' similar to the form of Figure 7.

Another modified form is illustrated in Figures 9 and 10 where the hub plate is designated 14$^a$. This hub plate is adapted to be fastened in place exactly like the hub plate 14 and it has an annular groove 17$^a$ functioning like that at 17. In lieu of the arcuate grooves 18, straight grooves 18$^b$ are provided, such grooves 18$^b$ communicating with the annular groove 17$^a$ through openings 18$^a$ and functioning similarly to the grooves 18.

I claim as my invention:—

A hub plate, comprising a circular disk provided with a central opening to receive an axle, said disk being securable to and rotatable with a wheel hub and bearing against a bearing structure, said disk having lubricant distributing grooves in its bearing face extending radially thereof, the opposite face of the disk provided with a circumferential groove surrounding said central opening and alined with the ends of the first mentioned grooves adjacent to the central opening of the disk, said circumferential groove communicating with the first mentioned grooves through openings in the disk, said circumferential groove providing means for supplying lubricant to the first mentioned grooves at their ends adjacent to the axle for distribution along said grooves by centrifugal force.

MATTHIAS CHRISTMAN.